United States Patent
Galm et al.

(10) Patent No.: US 10,090,650 B2
(45) Date of Patent: Oct. 2, 2018

(54) POWER PANEL SAFETY COVERS AND METHODS OF USE

(71) Applicant: LayerZero Power Systems, Inc., Aurora, OH (US)

(72) Inventors: James M. Galm, Chagrin Falls, OH (US); Mijo Dejanovic, Windham, OH (US); Milind Bhanoo, Chagrin Falls, OH (US)

(73) Assignee: LayerZero Power Systems, Inc., Aurora, OH (US)

( * ) Notice: Subject to any disclaimer, the term of this patent is extended or adjusted under 35 U.S.C. 154(b) by 0 days.

(21) Appl. No.: 15/937,311

(22) Filed: Mar. 27, 2018

(65) Prior Publication Data

US 2018/0219358 A1    Aug. 2, 2018

Related U.S. Application Data

(63) Continuation of application No. 15/346,062, filed on Nov. 8, 2016, now abandoned, which is a continuation-in-part of application No. 29/516,064, filed on Jan. 29, 2015, now Pat. No. Des. 805,039.

(60) Provisional application No. 62/253,255, filed on Nov. 10, 2015.

(51) Int. Cl.
*H02B 1/14* (2006.01)
*H02B 1/06* (2006.01)

(52) U.S. Cl.
CPC ............. *H02B 1/14* (2013.01); *H02B 1/06* (2013.01)

(58) Field of Classification Search
CPC ............ H02G 3/081; H02G 3/14; H05K 5/03; H05K 5/00; H05K 5/02; H01R 4/70; H01R 13/5213; H01R 13/46; H01R 13/424; H01R 13/436; H01R 1352/13; H02B 1/14; H02B 1/06
USPC ........ 174/5 R, 50, 66, 67, 138 F, 135, 138 G, 174/137 R, 520, 93; 220/241, 242; 439/536, 135, 717, 723, 367, 149; 361/600, 601
See application file for complete search history.

(56) References Cited

U.S. PATENT DOCUMENTS

| | | | | |
|---|---|---|---|---|
| 5,026,295 A | * | 6/1991 | Fong | H01R 13/5213 439/135 |
| 5,688,133 A | * | 11/1997 | Ikesugi | H01R 43/205 439/135 |
| 6,208,507 B1 | * | 3/2001 | Harvey | G06F 1/1628 361/679.55 |

(Continued)

*Primary Examiner* — Angel R Estrada
(74) *Attorney, Agent, or Firm* — Calfee, Halter & Griswold LLP

(57) ABSTRACT

An exemplary safety cover for a power panel includes at least one body, at least one connector, and at least one gripping portion. The body has a first surface and a second surface substantially parallel to and spaced apart from the first surface. A perimeter wall extends between at least a portion of a perimeter of the first surface to at least a portion of a perimeter of the second surface. The connector has a perimeter wall that extends from the second surface of the body to a distal end. A plurality of relief areas are located in the perimeter wall proximate the distal end of the connector. The connector also includes at least one stop that is spaced apart from the distal end of the perimeter wall. The connector is configured to removably engage at least one of a connector and an opening of the power panel.

20 Claims, 12 Drawing Sheets

(56) References Cited

U.S. PATENT DOCUMENTS

| | | | | |
|---|---|---|---|---|
| 6,390,320 B2 * | 5/2002 | Hurst | .................... | H05K 9/0016 |
| | | | | 220/3.8 |
| 6,439,901 B1 * | 8/2002 | Ji | ........................... | H05K 13/04 |
| | | | | 439/135 |
| 6,462,270 B1 * | 10/2002 | Depp | ..................... | H02G 3/081 |
| | | | | 174/50 |
| 6,576,838 B2 * | 6/2003 | Matsumura | .......... | H01H 85/044 |
| | | | | 174/50 |
| 6,599,140 B1 * | 7/2003 | Chen | ................. | H01R 43/0263 |
| | | | | 439/135 |
| 6,755,672 B2 * | 6/2004 | Lai | ......................... | H01R 13/44 |
| | | | | 174/138 F |
| 7,393,219 B2 * | 7/2008 | Liao | .................. | H01R 13/5213 |
| | | | | 439/135 |
| 7,559,807 B2 * | 7/2009 | Freimuth | ................. | H02B 1/14 |
| | | | | 439/717 |

* cited by examiner

POWER PANEL SAFETY COVERS AND METHODS OF USE

CROSS-REFERENCE TO RELATED APPLICATIONS

The present application is a continuation of U.S. patent application Ser. No. 15/346,062 ("the '062 Application") filed Nov. 8, 2016, which claims priority to, and any other benefit of, U.S. Provisional Application Ser. No. 62/253,255, filed on Nov. 10, 2015, and titled POWER PANEL SAFETY COVERS AND METHODS OF USE, the disclosures of which are incorporated herein by reference in their entireties. The '062 Application is also a continuation-in-part of U.S. Design patent application Ser. No. 29/516,064, filed Jan. 29, 2015, and titled COVER, the disclosure of which is incorporated herein by reference in its entirety.

TECHNICAL FIELD

The present invention relates generally to safety equipment for electrical system components, such as power distribution panels, and methods of using the same.

BACKGROUND OF THE INVENTION

Power distribution panels are known to those skilled in the art, e.g. LayerZero SafePanel™ power distribution panels. A typical power panel includes connectors that receive electrical components, such as circuit breakers. Openings in the connectors provide access to conductors of the panel. The electrical components make contact with the conductors through the openings in the connectors, thereby forming an electrical circuit. Fasteners may then be used to secure the electrical components to mounting locations on the power panel.

Applicants have appreciated the need for an electrically insulated cover to prevent someone from accidentally touching the conductors or any electrically activated portion of the power panel inside the openings while maintaining access to mounting locations used by an adjacent electrical component.

SUMMARY

Exemplary embodiments of power panel safety covers and methods of using power panel safety covers are disclosed herein.

An exemplary safety cover for a power panel includes at least one body, at least one connector, and at least one gripping portion. The body has a first surface and a second surface substantially parallel to and spaced apart from the first surface. A perimeter wall extends between at least a portion of a perimeter of the first surface to at least a portion of a perimeter of the second surface. At least one notch in the perimeter wall extends through the body from the first surface to the second surface. The connector has a perimeter wall that extends from the second surface of the body to a distal end. A plurality of relief areas are located in the perimeter wall proximate the distal end of the connector. The connector also includes at least one stop that is spaced apart from the distal end of the perimeter wall. The connector is configured to removably engage at least one of a connector and an opening of the power panel. Lastly, the at least one notch in the body provides access to at least one fastener of the power panel.

Another exemplary embodiment of the present disclosure relates to a method for using safety covers for power panels. The method includes providing one or more safety covers attached to a power panel, removing at least one safety cover from the power panel, and connecting at least one electrical component to at least one of the connectors of the power panel that previously were engaged by the safety cover. The safety covers have a body, at least one connector, and at least one grip. The body has a first surface, a second surface substantially parallel to and spaced apart from the first surface, a perimeter wall extending between a perimeter of the first surface to a perimeter of the second surface, and at least one notch in the perimeter wall extending from the first surface to the second surface. The at least one connector has a receptacle formed by a perimeter wall extending from the second surface of the body to an end, a plurality of expansion areas in the perimeter wall proximate the end of the receptacle, and at least one stop within the receptacle.

Still another exemplary embodiment of the present disclosure relates to a method for using safety covers for a power panel having conductors that are continuously electrically active during operation and also having openings exposing the continuously electrically active conductors. The method includes providing one or more safety covers attached to the power panel to cover at least one of the openings, removing at least one safety cover from the power panel while the conductors of the power panel are continuously electrically active, and connecting at least one electrical component to at least one of the conductors of the power panel that previously were covered by the safety cover while the conductors of the power panel are continuously electrically active. The safety covers have a body with at least one grip and at least one closed cover integrally molded to or otherwise affixed to the body to cover at least one of the power panel openings.

BRIEF DESCRIPTION OF THE DRAWINGS

These and other features and advantages of the present invention will become better understood with regard to the following description and accompanying drawings in which.

DETAILED DESCRIPTION

This Detailed Description merely describes exemplary embodiments of the invention and is not intended to limit the scope of the claims in any way. Indeed, the invention as claimed is broader than the exemplary embodiments, and the terms used in the claims have their full ordinary meaning, unless a limiting definition is expressly provided herein.

Figure 1A:
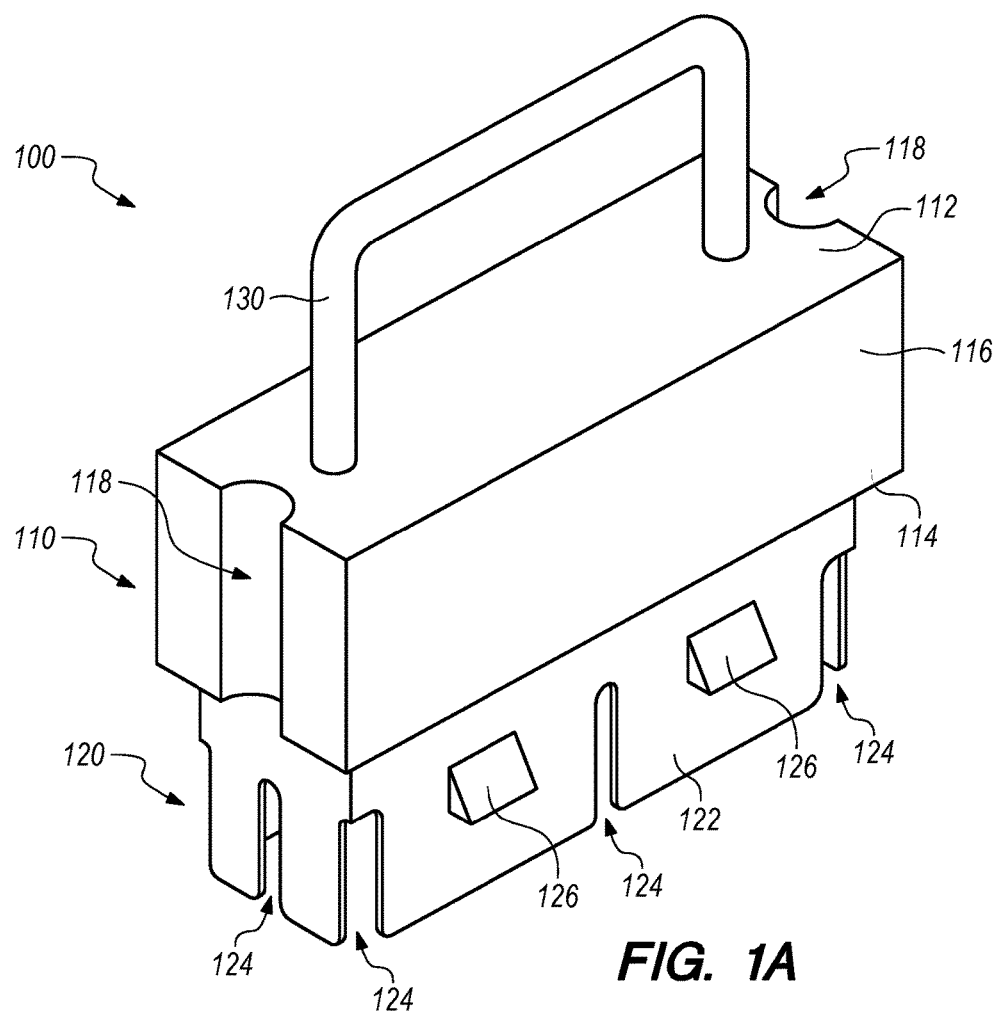
FIG. 1A is a front/left/top perspective view of an exemplary power panel safety cover.

Referring now to FIG. 1A, an exemplary power panel safety cover 100 is shown. The safety cover 100 has a body 110, a connector 120, and a gripping portion 130. The body has a top surface 112, a bottom surface 114, and a perimeter wall 116. The top and bottom surfaces 112, 114 are substantially parallel and are spaced apart from each other. The perimeter wall 116 extends between at least a portion of the top surface 112 to at least a portion of the bottom surface 114. In some embodiments, the top and bottom surfaces 112, 114 are at an angle to each other, or are curved. For example, the top and bottom surfaces 112, 114 may each have a curve radius so that the body 110 of the cover 100 has an arcuate shape.

The perimeter wall 116 includes two notches 118 extending from the top surface 112 to the bottom surface 114. When the safety cover 100 is installed in a power panel (shown in FIGS. 3, 6A, 7, and 8) the notches 118 in the body 110 provide access to fasteners (shown in FIG. 7) or other fastening devices on the power panel. While two notches 118 are shown, the safety cover 100 may include any number of notches 118, depending on the number and location of fasteners on the power panel. Also, while the notches 118 are shown near the center of the safety cover 100, they may be positioned anywhere access to a fastener is needed.

The connector 120 of the safety cover 100 is formed by a perimeter wall 122 extending from the bottom surface 114 of the body 110 to a distal end. The perimeter wall 122 includes a plurality of relief areas 124 and at least one stop 126. The connector 120 is sized to receive or be received by at least one connector of a power panel. While the safety cover 100 is shown with only one connector 120, the safety cover 100 may have any number of connectors based on the number of corresponding connectors on a safety panel.

The relief areas 124 allow the perimeter wall 122 to flex when the safety cover 100 is installed in a power panel, thereby compensating for minor size differences between the connectors of the power panel and the connector 120 of the safety cover 100. Friction between the interior surface of the connector 120 and the connectors of a power panel holds the safety covers 100 in place on the power panel. In some exemplary embodiments, the covers 100 are held in place by a "friction fit." The stops 126 limit the engagement between the connector 120 and the connectors of a safety panel to prohibit the safety cover 100 from becoming stuck or damaged by over-engagement with the power panel. In some embodiments, the stops 126 form a ridge in the perimeter wall 122.

The gripping portion 130 extends from the top surface 112 of the body 110 to allow a user to easily remove the safety cover 100 from a power panel. The gripping portion 130 may be any kind of handle attached to the body 110, or may be integrally formed with the body 110.

Figure 1B:
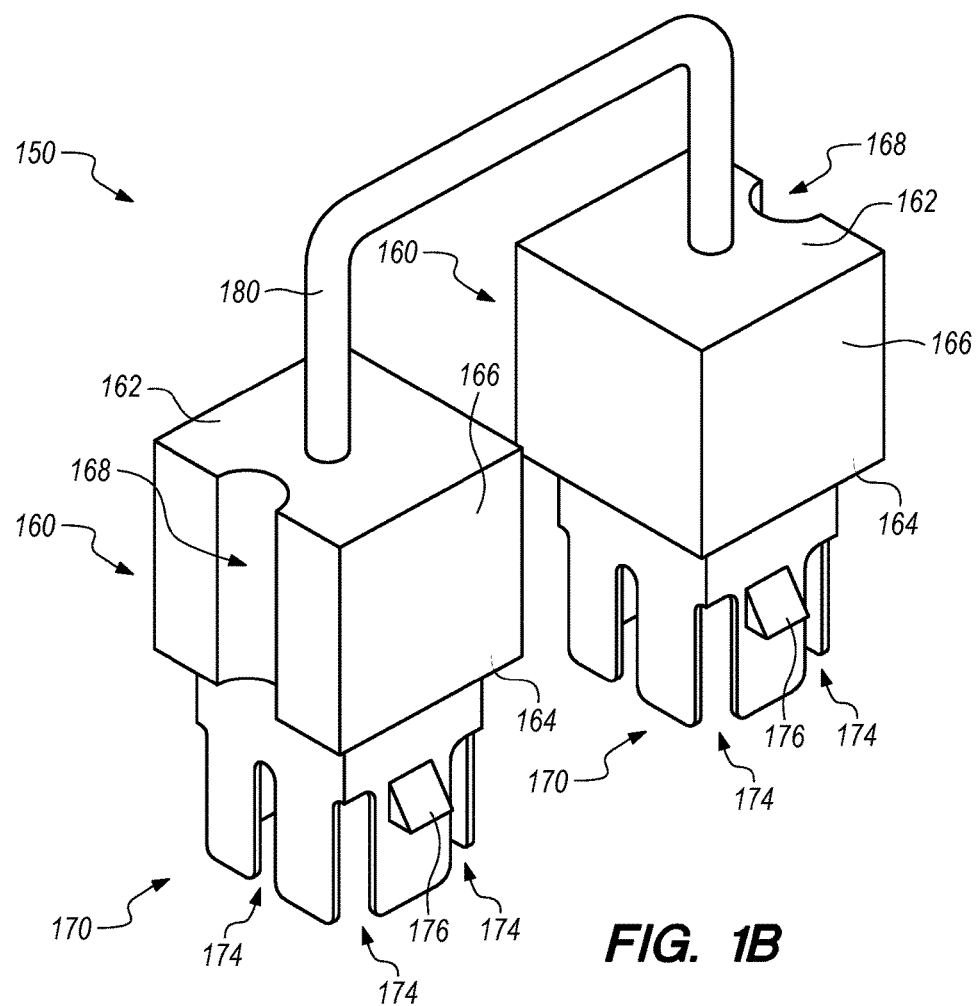
FIG. 1B is a front/left/top perspective view of a second embodiment of an exemplary power panel safety cover.

Referring now to FIG. 1B, another exemplary power panel safety cover 150 is shown. The safety cover 150 has two bodies 160, a connector 170 extending from each body 160, and a gripping portion 180 connecting the two bodies 160. Each body has a top surface 162, a bottom surface 164, and a perimeter wall 166. The top and bottom surfaces 162, 164 are substantially parallel and are spaced apart from each other. In each body 160, the perimeter wall 166 extends between at least a portion of the top surface 162 to at least a portion of the bottom surface 164.

The perimeter wall 166 of each body 160 includes a notch 168 extending from its top surface 162 to its bottom surface 164. When the safety cover 150 is installed in a power panel (not shown) the notches 168 in the bodies 160 provide access to fasteners (not shown) or other fastening devices on the power panel. While two notches 168 are shown (one on each of the two bodies 160), the safety cover 150 may include any number of notches 168 in any location around the periphery of the bodies 160, depending on the number and location of fasteners on the power panel. In some exemplary embodiments, no notches are included.

The connectors 170 of the safety cover 150 are formed by perimeter walls 172 extending from the bottom surface 164 of the each body 160 to a distal end. The perimeter walls 172 include a plurality of relief areas 174 and at least one stop 176. The connectors 170 are sized to receive or be received each by at least one connector of a power panel. While the safety cover 150 is shown with two connectors 170, the safety cover 150 may have any number of connectors based on the number of corresponding connectors on a safety panel.

The relief areas 164 allow the perimeter walls 172 to flex when the safety cover 150 is installed in a power panel, thereby compensating for minor size differences between the connectors of the power panel and the connectors 170 of the safety cover 150. Friction between the interior surface of the connectors 170 and the connectors of a power panel holds the safety covers 150 in place on the power panel. In some exemplary embodiments, the covers 150 are held in place by a "friction fit." The stops 176 limit the engagement between the connectors 170 and the connectors of a safety panel to prohibit the safety cover 150 from becoming stuck or damaged by over-engagement with the power panel.

The gripping portion 180 extends from the top surfaces 162 of the bodies 160 to allow a user to easily remove the safety cover 150 from a power panel. In the safety cover 150, the gripping portion 180 also prevents a user from contacting connectors of a power panel that are between the two bodies 160 of the cover 150. The gripping portion 180 may be rigid (e.g., a handle) or may be flexible (e.g., a rope or cable). The gripping portion 130 may be any kind of handle attached to the bodies 160, or may be integrally formed with the bodies 160.

Referring now to FIGS. 2A-2D, another exemplary power panel safety cover 200 is shown. The safety cover 200 has a body 210, connectors 220, and a gripping portion 230. The body has a top surface 212, a bottom surface 214, and a perimeter wall 216. The top and bottom surfaces 212, 214 are substantially parallel and are spaced apart from each other. The perimeter wall 216 extends between at least a portion of the top surface 212 to at least a portion of the bottom surface 214. In some embodiments, the top and bottom surfaces 212, 214 are at an angle to each other, or are curved. For example, the top and bottom surfaces 212, 214 may each have a curve radius so that the body 210 of the cover 200 has an arcuate shape.

The perimeter wall 216 includes notches 218 extending from the top surface 212 to the bottom surface 214 at each corner of the body 210. When the safety cover 200 is installed in a power panel (not shown) the notches 218 in the body 210 provide access to fasteners (not shown) or other fastening devices on the power panel. While four notches 218 are shown, the safety cover 200 may include any number of notches 218, depending on the number and location of fasteners on the power panel.

Figure 2A:
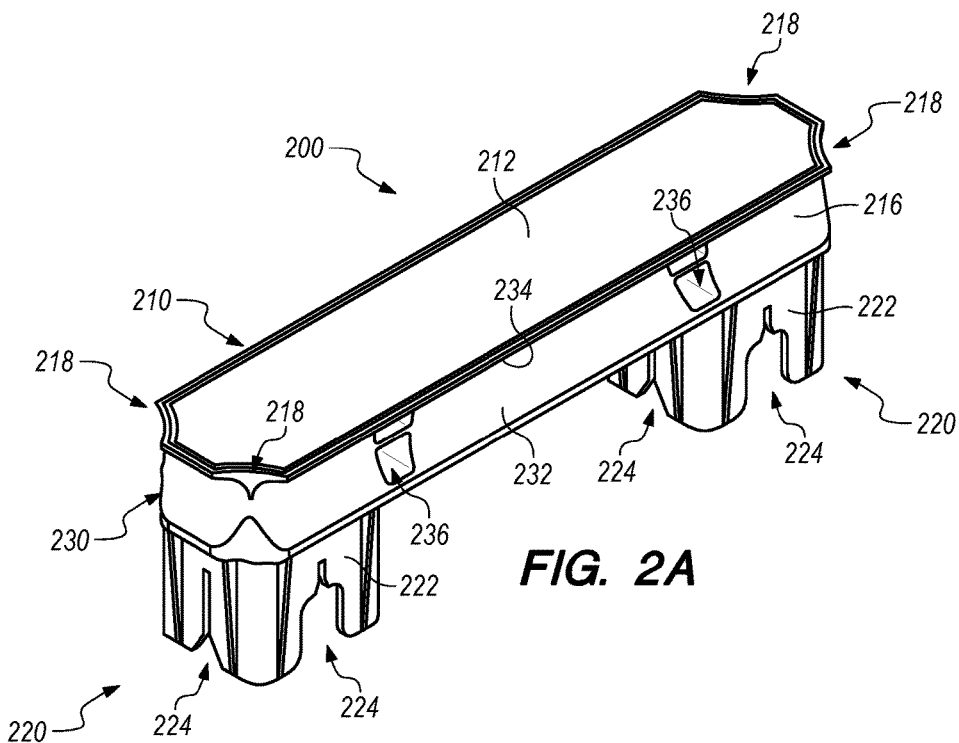
FIG. 2A is a front/left/top perspective view of a third embodiment of an exemplary power panel safety cover.
Figure 2B:
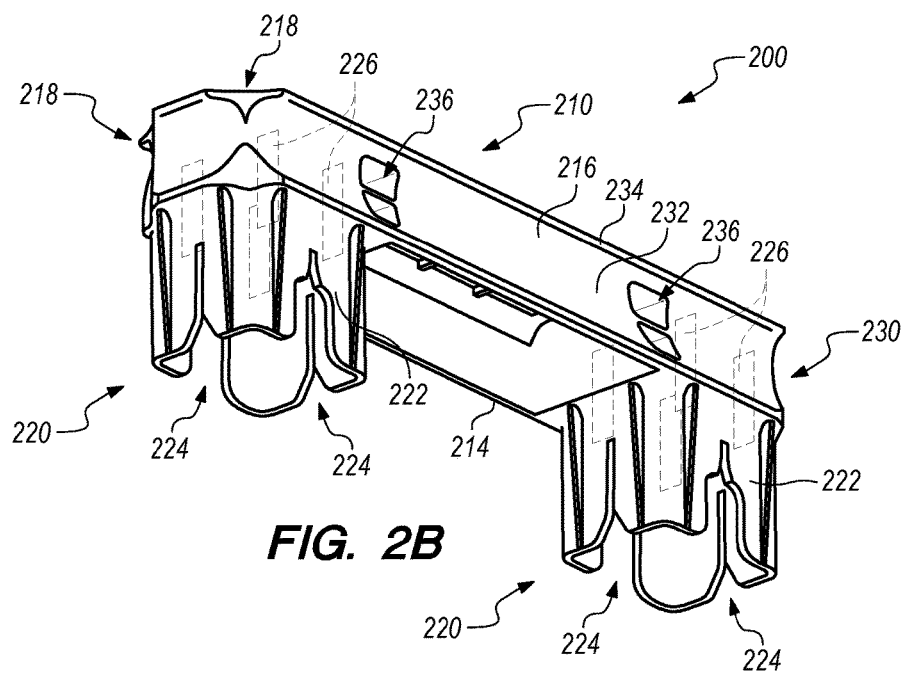
FIG. 2B is a front/left/bottom perspective view of a the exemplary power panel safety cover of FIG. 2A.
Figure 2C:
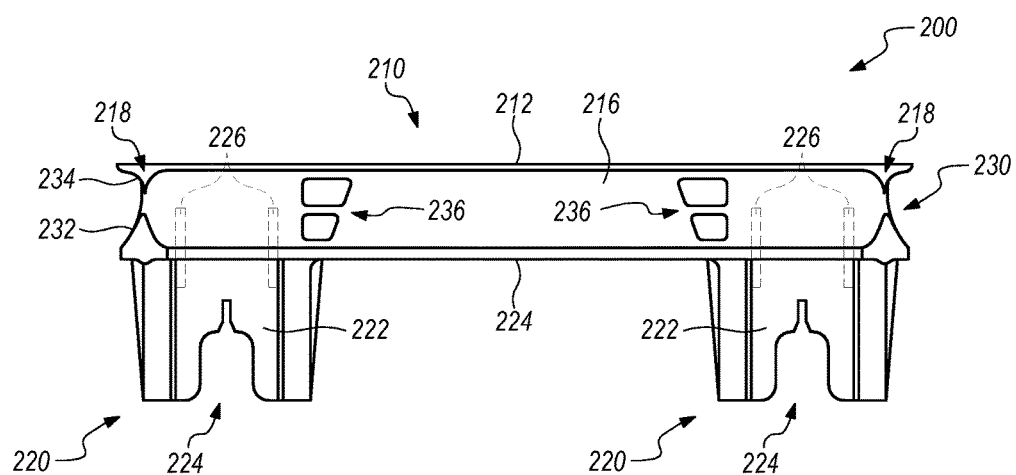
FIG. 2C is a front view of the exemplary power panel safety cover of FIG. 2A.
Figure 2D:
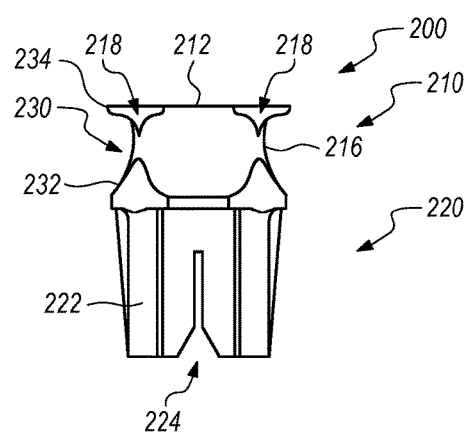
FIG. 2D is a left side view of the exemplary power panel safety cover of FIG. 2A.

The connectors 220 of the safety cover 200 is formed by perimeter walls 222 extending from the bottom surface 214 of the body 210 to distal ends. The perimeter walls 222 include an interior surface 223, a plurality of relief areas 224, and at least one stop 226 (FIG. 2B). The stops 226 are disposed within the connectors 220. The connectors 220 are sized to receive or be received by at least one connector of a power panel. While the safety cover 200 is shown with two connectors 220, the safety cover 200 may have any number of connectors based on the number of corresponding connectors on a power panel. Friction between the interior surface of the connectors 220 and the connectors of a power panel holds the safety covers 200 in place on the power panel. In some exemplary embodiments, the covers 200 are held in place by a "friction fit" so the covers 200 can are installed and retained in place on a power panel without fasteners or other devices, and removed without using tools. In some exemplary embodiments, the force required to remove a cover 200 from a power panel is between about 6.4 pounds to about 9 pounds. In some exemplary embodiments, the interior surfaces of the connectors 220 are tapered to increase the holding force the further the covers 200 are pushed over the connectors 220. For example, in some exemplary embodiments, the interior surface 223 of the perimeter wall 224 is tapered between about 0.93 degrees to about 1.0 degrees. Tapering the interior surface 223 of the perimeter wall 224 provides an added benefit of making the covers easier to remove from molds in embodiments where the safety covers are made with a molding process, i.e., the taper provides mold draft.

The relief areas 224 allow the perimeter walls 222 to flex when the safety cover 200 is installed in a power panel, thereby compensating for minor size differences between the connectors of the power panel and the connectors 220 of the safety cover 200. The stops 226 within the connectors 220 limit the engagement between the connector 220 and the connectors of a safety panel to prohibit the safety cover 200 from becoming stuck or damaged by over-engagement with the power panel.

The gripping portion 230 is formed by the perimeter wall 222 and is integrally formed with the body 210. The perimeter wall 222 forms a concave surface 232 around the sides of the body 210 that allow a user to grip the cover 200. An edge 234 at the intersection of the top surface 212 and the perimeter wall 222 protrudes from the body 210 between the notches 218 to extend the grippable area of the gripping portion 230. The gripping portion 230 allows a user to easily remove the safety cover 200 from a power panel.

In some embodiments, the cover includes openings 236 for receiving an link insert (See, e.g., FIG. 9B) that allows multiple covers 200 to be joined together.

Figure 3:
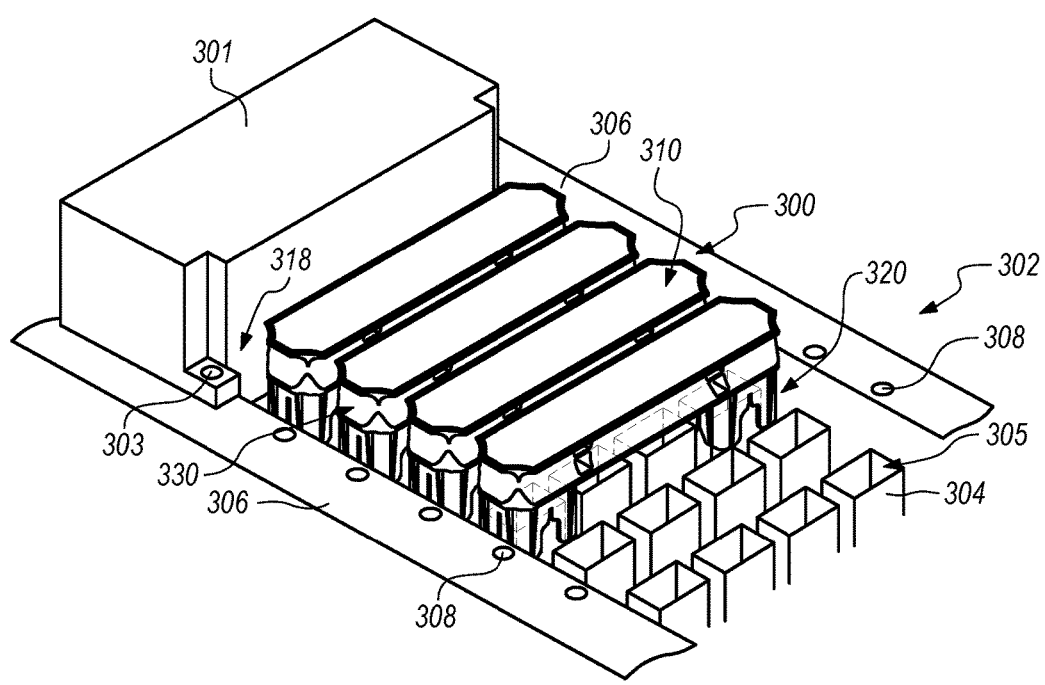
FIG. 3 is a front/left/top perspective view of multiple exemplary power panel safety covers and a circuit breaker assembled to a power panel.

Referring now to FIG. 3, a plurality of exemplary power panel safety covers 300 are shown assembled to a power panel 302. The power panel 302 includes a plurality of connectors 304 that allow access to conductors (not shown) through openings 305. Mounting rails 306 adjacent the connectors 304 allow electrical components 303 to be mounted on the power panel 302. The rails 306 include a plurality of mounting locations 308. Fasteners 303 are used to secure the electrical components 301 to the mounting locations 308 on the mounting rails 306. In some embodiments, threaded fasteners are used. In some embodiments, other means of fastening the electrical components to the mounting locations 308 along the rails 306 are used, such as, for example, snaps, latches, quarter turn fasteners, or the like.

The safety covers 300 are similar to the safety covers 200 described above. The safety cover 300 has a body 310, connectors 320, and a gripping portion 330. The connectors 320 of the cover 300 connect to connectors 304 of the power panel 302 to protect a user from contact with any energized conductors exposed through the interior 305 of the connectors 304. Notches 318 in the body 310 of the covers 300 allow access to fasteners 303 securing adjacent electrical components 301 to the rails 306.

In the illustrated embodiment, the connectors 304 of the power panel 302 are arranged in an array. Each safety cover 300 covers a row of connectors 304 when it is assembled to the power panel 302. To install an electrical component, one or more safety covers 300 are removed to expose the connectors 304. The number of safety covers 300 removed from the power panel 302 corresponds to the size of the particular electrical component 301 being installed. For example, three safety covers 300 may be removed to install a circuit breaker (not shown) that connects to three rows of connectors 304 of the panel 302.

Figure 4:
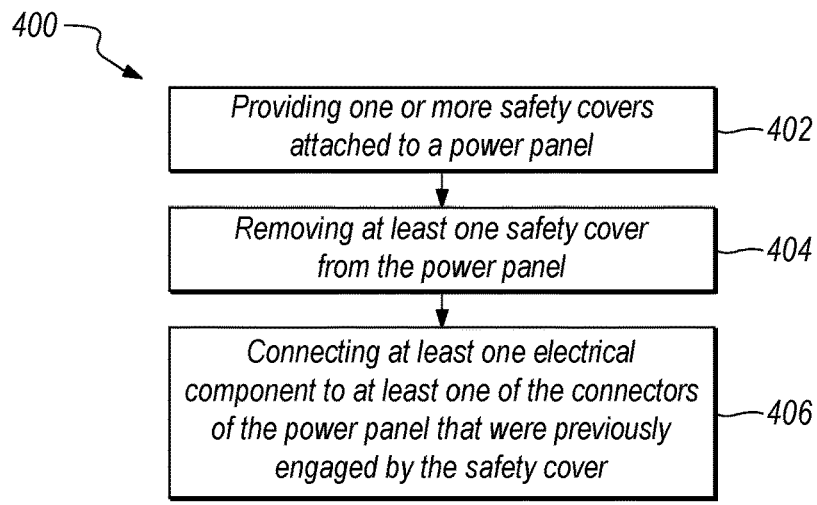
FIG. 4 is a flow chart describing the steps of an exemplary method of using power panel safety covers.

Referring now to FIG. 4, a flow chart of an exemplary method 400 of using power panel safety covers is shown. The exemplary method 400 includes: providing one or more safety covers attached to a power panel, at 402; removing at least one safety cover from the power panel, at 404; and connecting at least one electrical component to at least one of the connectors of the power panel that were previously engaged by the safety cover, at 406. The exemplary method 400 can be implemented with any of the exemplary power panel safety covers described above, or another power panel safety cover.

Figure 5:
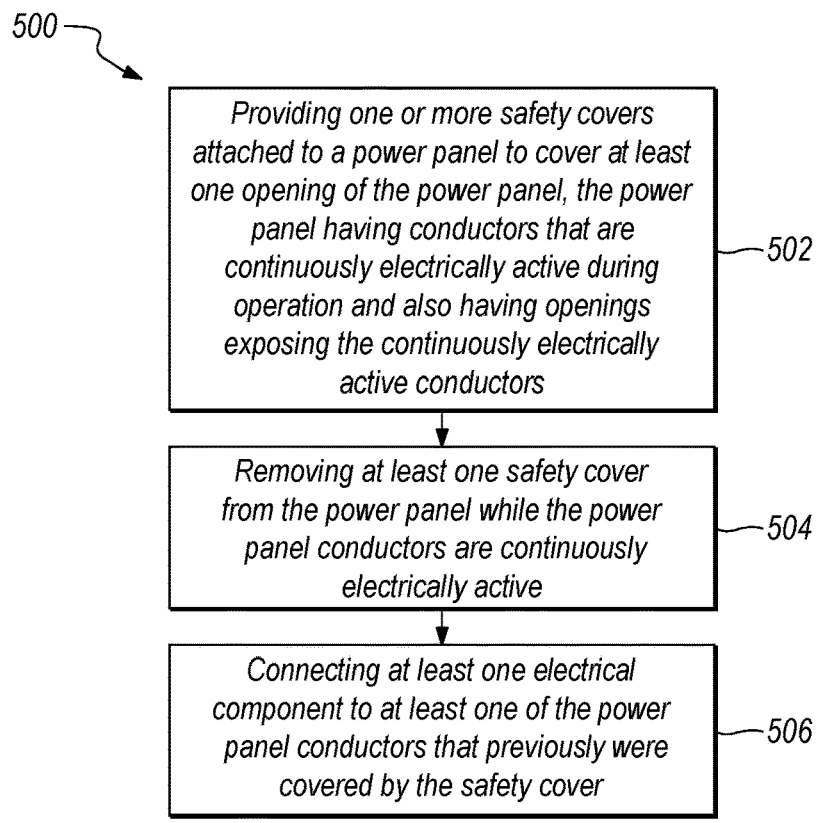
FIG. 5 is a flow chart describing the steps of another exemplary method of using power panel safety covers.
Figure 6A:
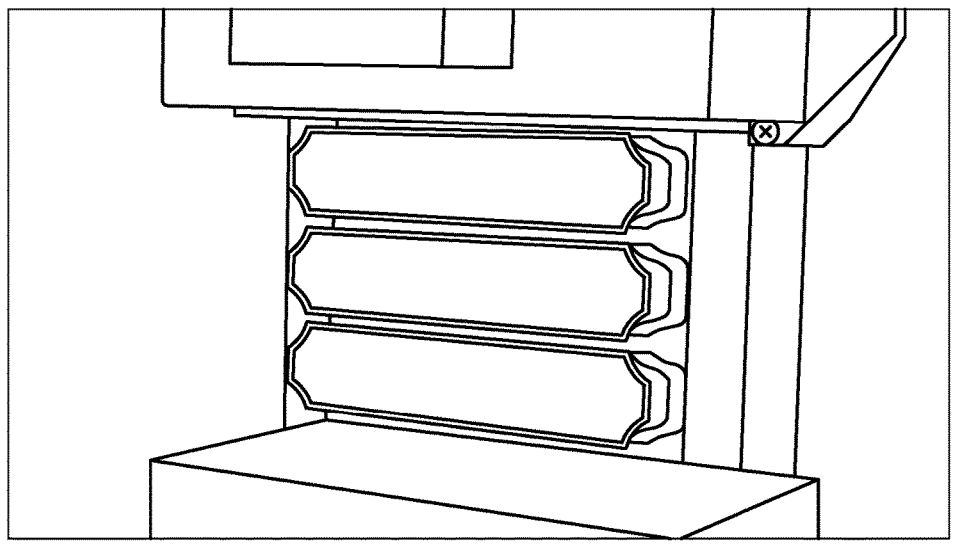
FIG. 6A shows power panel safety covers installed on a power panel between two circuit breakers.
Figure 6B:
FIG. 6B shows a user removing the power panel safety covers of FIG. 6A to install another circuit breaker.
Figure 6C:
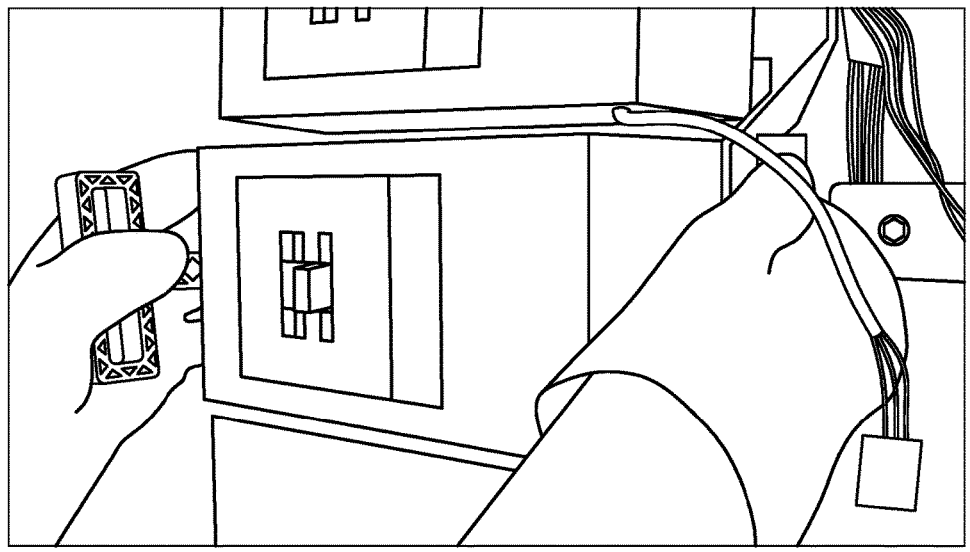
FIG. 6C shows a circuit breaker being installed on the power panel where the power panel safety covers of FIG. 6A were previously attached to the power panel.
Figure 6D:
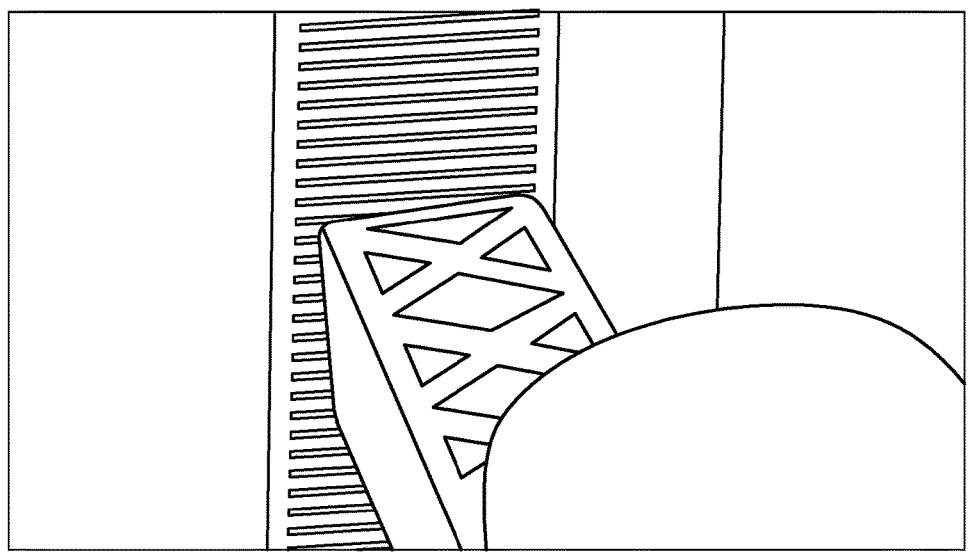
FIG. 6D shows a T-Handle used to install the circuit breaker being removed from the circuit breaker.
Figure 6E:
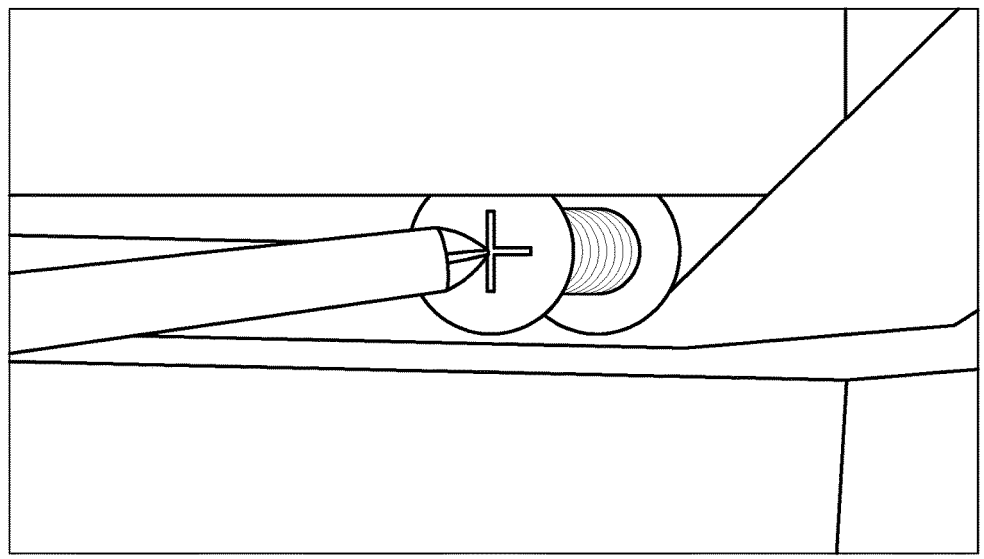
FIG. 6E shows a screw being used to mount the circuit breaker to the power panel.
Figure 6F:
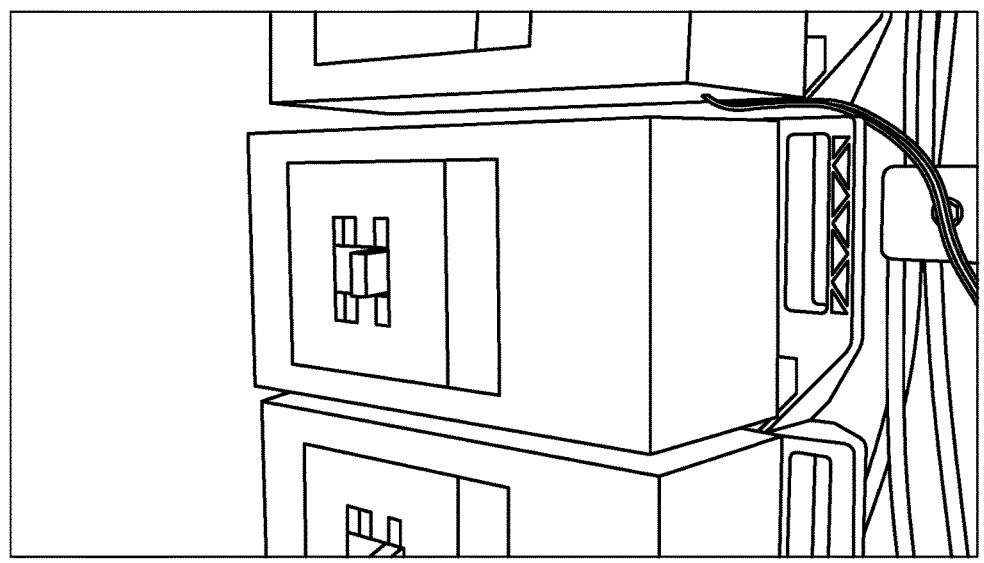
FIG. 6F shows the circuit breaker installed in the power panel.

Referring now to FIG. 5, a flow chart of another exemplary method 500 of using power panel safety covers is shown. The method includes: providing one or more safety covers attached to a power panel to cover at least one opening of the power panel, the power panel having conductors that are continuously electrically active during operation and also having openings exposing the continuously electrically active conductors, at 502; removing at least one safety cover from the power panel while the power panel conductors are continuously electrically active, at 504; and connecting at least one electrical component to at least one of the power panel conductors that previously were covered by the safety cover, 506.

Referring now to FIGS. 6A-6F, power panel safety covers are shown being removed from a power panel while the power panel conductors are continuously electrically active before a circuit breaker can be installed. The circuit breaker is installed on the power panel while the power panel conductors are continuously electrically active in the location where the safety covers were previously attached.

Figure 7:
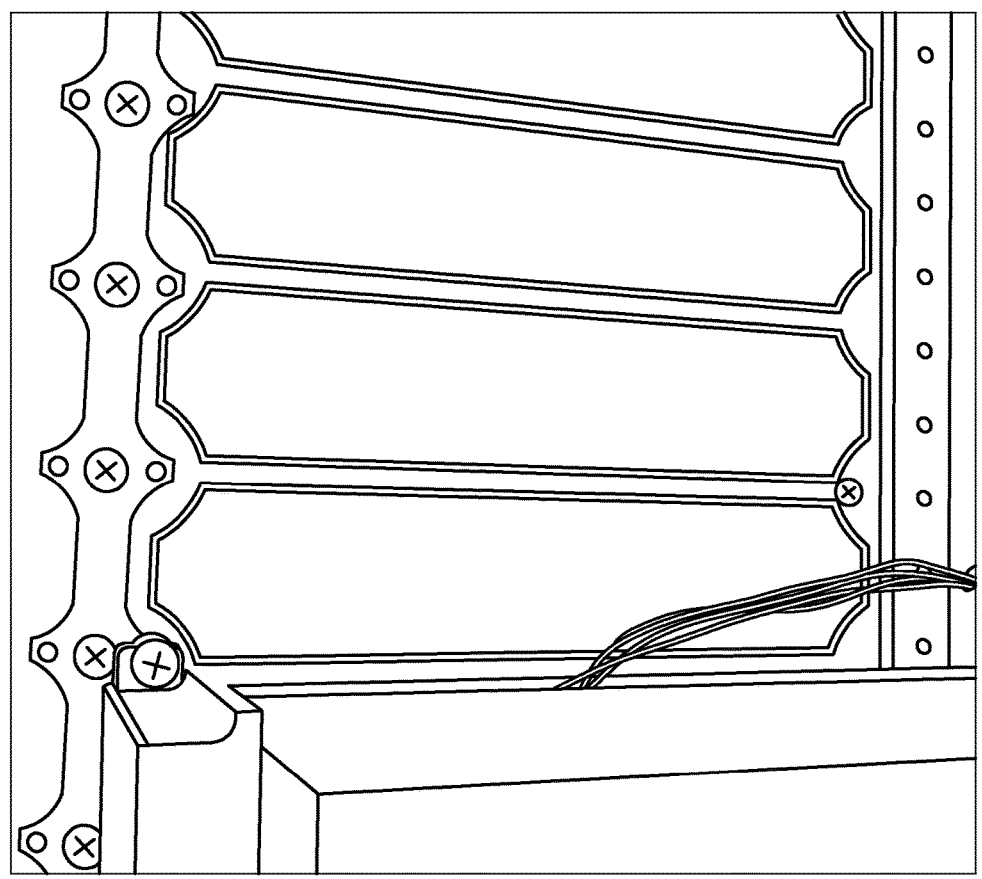
FIG. 7 shows power panel safety covers attached to a power panel adjacent a circuit breaker.

Referring now to FIG. 7, power panel safety covers are shown attached to a power panel adjacent an electrical component. As can be seen in the lower left of the photo, the notch in the safety cover provides access to the fastener used to secure the electrical component to the power panel.

Figure 8:
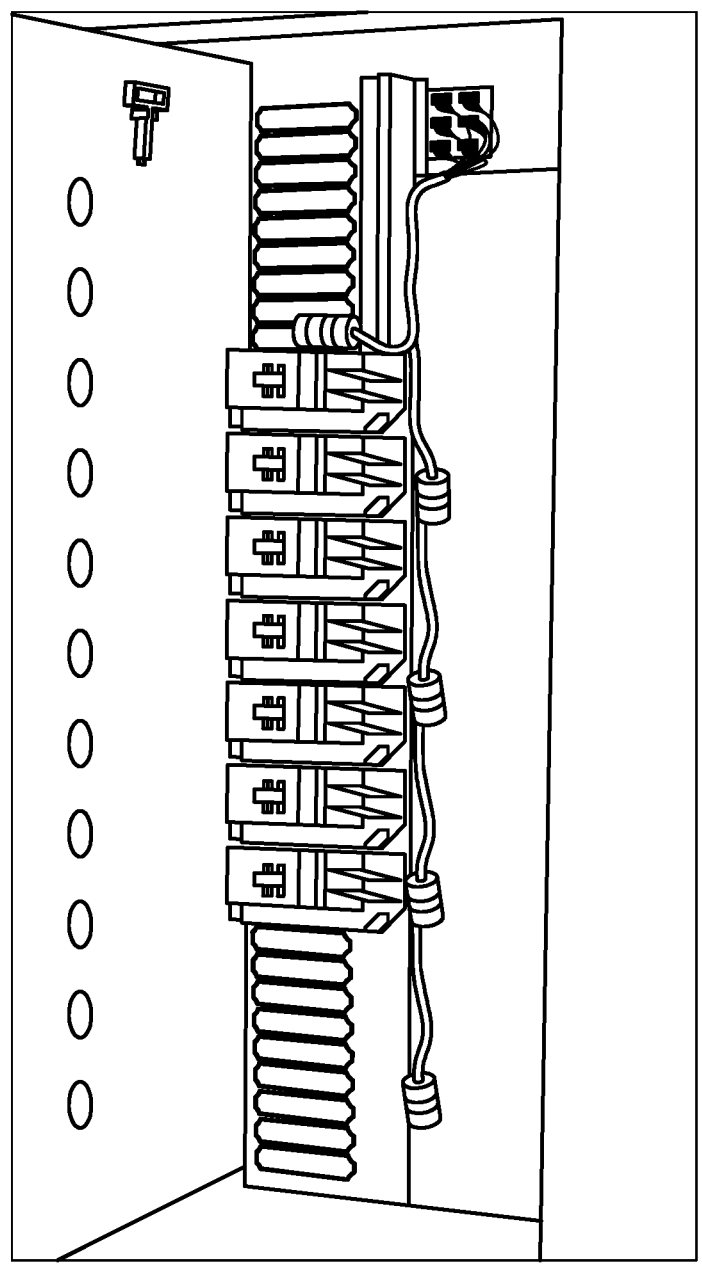
FIG. 8 shows a plurality of power panel safety covers and circuit breakers installed on a power panel that is housed in a cabinet.

Referring now to FIG. 8, a plurality of power panel safety covers and circuit breakers are shown installed on a power panel that is housed in a cabinet. The safety covers cover the unused connectors of the panel to prohibit contact with active electrical components of the panel.

Figure 9A:
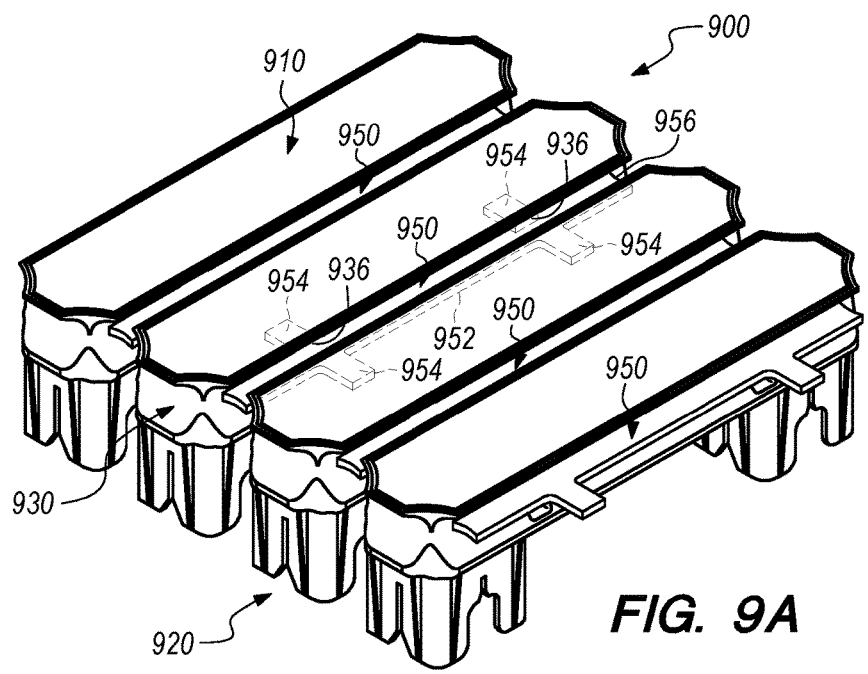
FIG. 9A shows a plurality of power panel safety covers joined together with link inserts.
Figure 9B:
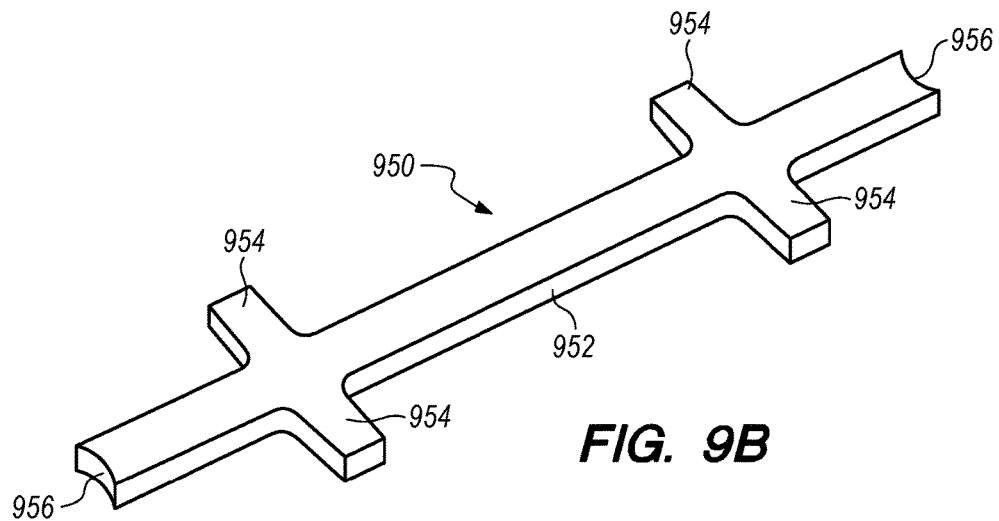
FIG. 9B shows a top/front/left perspective view of a link insert.

Referring now to FIGS. 9A-9B, a plurality of power panel safety covers 900 are shown joined together by link inserts 950. Each safety cover 900 has a body 910, connectors 920, and a gripping portion 930. The link inserts 950 have a body 952 with a plurality of arms 954 extending away from the body 952. In some embodiments, the ends 956 of the body 952 are recessed to prevent interference with nearby components, such as, for example, fasteners of a power panel. The gripping portions 930 of the safety covers 900 include openings 936 for receiving the arms 954 of the link inserts 950, allowing multiple covers 900 to be joined together. The openings 936 and arms 954 can be joined together with a friction fit connection, a snap connection, a fastener connection, a ball detent connection, or the like. The joined together safety covers 900 are installed and removed from a power panel together.

In some exemplary embodiments, the exemplary covers of FIGS. 1-8 are molded (or otherwise formed, e.g., milled from a piece of material) as a single unitary piece from plastic, e.g., Sabic Cycolac Flame Retardant Resin FR15U, an ABS plastic with electrical insulating properties, DuPont ZYTEL 101, a polyamide plastic with electrical insulating properties, or any other moldable material that is a dielectric insulator, does not burn with an open flame, is fatigue resistant, heat resistant, chemical resistant, and dimensionally stable. In the alternative, the exemplary covers of FIGS. 1-8 can be molded in a plurality of parts that are affixed, e.g., adhered, welded, or otherwise affixed, or otherwise formed (e.g., milled) from a plurality of pieces of material that are affixed, e.g., adhered, welded, or otherwise affixed. In some exemplary embodiments, the link inserts are made from the same material used to make the safety covers (e.g. the materials listed above). Alternatively, the exemplary link inserts can be made from other plastics, metals, or any other suitably rigid material.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, the cover could extend to more than one row of connectors of the power panel, or could extend to fewer than four columns of connectors of the power panel. As yet still another example, the cover could use a locking mechanism rather than relying on friction to hold the cover in place on the power panel. As another example, the steps of all processes and methods herein can be performed in any order, unless two or more steps are expressly stated as being performed in a particular order, or certain steps inherently require a particular order. Accordingly, departures may be made from such details without departing from the spirit or scope of the applicant's general inventive concept.

What is claimed is:

1. A safety cover for a power panel comprising:
   at least one body comprising:
      a first surface;
      a second surface substantially parallel to and spaced apart from the first surface; and
      a perimeter wall extending between at least a portion of a perimeter of the first surface to at least a portion of a perimeter of the second surface;
   at least one connector comprising:
      a perimeter wall extending from the second surface of the body, the perimeter wall having a distal end;
      a plurality of relief areas proximate the distal end of the perimeter wall; and
      at least one stop spaced apart from the distal end of the perimeter wall; and
   at least one gripping portion;
   wherein the connector is configured to removably engage at least one of a connector and an opening of the power panel.

2. The safety cover of claim 1, wherein the gripping portion comprises a concave groove in the perimeter wall.

3. The safety cover of claim 1, wherein the gripping portion comprises a handle extending from the first surface.

4. The safety cover of claim 1, wherein the stop of the connector limits the engagement of the safety cover with the connector and the opening of the power panel.

5. The safety cover of claim 1, wherein the stop is disposed on an exterior surface of the perimeter wall of the connector.

6. The safety cover of claim 1, wherein the stop is disposed on an interior surface of the perimeter wall of the connector.

7. The safety cover of claim 1, further comprising:
   at least one notch in the perimeter wall of the body, the notch extending through the body from the first surface to the second surface;
   wherein the notch in the body provides access to at least one fastener of the power panel.

8. The safety cover of claim 1, wherein the perimeter wall of the connector is tapered.

9. The safety cover of claim 1, wherein the safety cover comprises:
   a first body and a second body;
   a first connector disposed on the first body; and
   a second connector disposed on the second body;
   wherein the gripping portion is attached to the first and second bodies.

10. The safety cover of claim 9, further comprising:
    a first notch in the perimeter wall of the first body extending through the first body from the first surface to the second surface; and
    a second notch in the perimeter wall of the second body extending through the second body from the first surface to the second surface;
    wherein the first and second notches each provide access to at least one fastener of the power panel.

11. The safety cover of claim 1, further comprising at least one opening in the perimeter wall of the body.

12. The safety cover of claim 11, further comprising a link insert disposed at least partially within the opening, the link insert comprising:
    a body; and
    a plurality of arms extending away from the body.

13. The safety cover of claim 12, wherein the link insert links to additional safety cover.

14. A method for using safety covers for power panels, comprising:

providing one or more safety covers attached to one or more connectors of a power panel, the safety covers comprising:
- a body comprising a first surface, a second surface substantially parallel to and spaced apart from the first surface, and a perimeter wall extending between a perimeter of the first surface to a perimeter of the second surface;
- at least one connector comprising a receptacle formed by a perimeter wall extending from the second surface of the body to an end, a plurality of expansion areas in the perimeter wall proximate the end of the receptacle, and at least one stop within the receptacle; and
- at least one grip;

removing at least one safety cover from the power panel; and connecting at least one electrical component to at least one of the connectors of the power panel that previously were engaged by the safety cover.

15. The method of claim 14, wherein the body of the safety cover includes at least one notch in the perimeter wall extending from the first surface to the second surface.

16. The method of claim 14, further comprising:
providing at least one link insert, the link insert comprising:
- a body; and
- a plurality of arms extending away from the body; and using at least one link insert to join two or more safety covers together.

17. The method of claim 14, wherein the providing step comprises providing a safety cover having at least two closed covers integrally molded to or otherwise affixed to the body, the closed covers spaced from each other and covering at least two of the power panel openings.

18. A method for using safety covers, the method comprising:
continuously supplying power to a power panel having conductors that are continuously electrically active during operation and also having opening exposing the continuously electrically active conductors;

providing one or more safety covers attached to the power panel to cover at least one of the openings, the safety covers comprising:
- a body comprising at least one grip; and
- at least one closed cover integrally molded to or otherwise affixed to the body to cover at least one of the power panel openings;

while power is supplied to the power panel so that the conductors of the power panel are continuously electrically active, removing at least one safety cover from the power panel; and while power is supplied to the power panel so that the conductors of the power panel are continuously electrically active, connecting at least one electrical component to at least one of the conductors of the power panel that previously were covered by the safety cover.

19. The method of claim 18, further comprising:
while power is supplied to the power panel so that the conductors of the power panel are continuously electrically active, disconnecting at least one electrical component from at least one of the power panel conductors; and while power is supplied to the power panel so that the conductors of the power panel are continuously electrically active, covering with at least one safety cover the power panel conductors from which the at least one electrical device was disconnected.

20. The method of claim 18, further comprising:
providing at least one link insert, the link insert comprising:
- a body; and
- a plurality of arms extending away from the body; and using at least one link insert to join two or more safety covers together.

* * * * *